US008265974B2

(12) United States Patent
Wadhwani et al.

(10) Patent No.: US 8,265,974 B2
(45) Date of Patent: Sep. 11, 2012

(54) TECHNOLOGICAL INFRASTRUCTURE CONSUMPTION INDEX

(75) Inventors: Rajat Wadhwani, Closter, NJ (US); Leigh Anne Whitlock, Charlotte, NC (US); Susan McClung, Charlotte, NC (US); Heidi Jane Johnson, Charlotte, NC (US); Angela K. Workman, Ponte Vedra Beach, FL (US); Kevin R. Davis, Charlotte, NC (US); Steve A. Erickson, Charlotte, NC (US); Vijay B. Akella, Charlotte, NC (US); Michael J. Ragunas, Weddington, NC (US)

(73) Assignee: Bank of America Corporation, Charlotte, NC (US)

( * ) Notice: Subject to any disclaimer, the term of this patent is extended or adjusted under 35 U.S.C. 154(b) by 373 days.

(21) Appl. No.: 12/618,457

(22) Filed: Nov. 13, 2009

(65) Prior Publication Data
US 2011/0119103 A1    May 19, 2011

(51) Int. Cl.
*G06Q 10/00* (2012.01)
(52) U.S. Cl. .............. 705/7.12; 705/7.11; 705/7.23
(58) Field of Classification Search ........ 705/7.11–7.36; 709/224
See application file for complete search history.

(56) References Cited

U.S. PATENT DOCUMENTS

| | | | |
|---|---|---|---|
| 6,469,998 B1 * | 10/2002 | Burgaleta Salinas et al. | 370/338 |
| 6,564,174 B1 * | 5/2003 | Ding et al. | 702/186 |
| 2002/0049621 A1 * | 4/2002 | Bruce | 705/7 |
| 2002/0152304 A1 * | 10/2002 | Collazo | 709/224 |
| 2003/0133552 A1 * | 7/2003 | Pillai et al. | 379/114.2 |
| 2004/0128261 A1 * | 7/2004 | Olavson et al. | 705/400 |
| 2005/0144025 A1 * | 6/2005 | Katz et al. | 705/1 |
| 2005/0159969 A1 * | 7/2005 | Sheppard | 705/1 |
| 2005/0256692 A1 * | 11/2005 | Monin et al. | 703/22 |
| 2005/0267949 A1 * | 12/2005 | Scott, III | 709/219 |
| 2006/0041544 A1 * | 2/2006 | Santosuosso | 707/4 |
| 2006/0149765 A1 * | 7/2006 | Knoerle et al. | 707/101 |
| 2006/0212512 A1 * | 9/2006 | Grabarnik et al. | 709/203 |
| 2006/0224436 A1 * | 10/2006 | Matsumoto et al. | 705/10 |
| 2007/0299749 A1 * | 12/2007 | Lovell, Jr. | 705/28 |
| 2008/0033785 A1 * | 2/2008 | Anke | 705/10 |
| 2008/0306985 A1 * | 12/2008 | Murray et al. | 707/102 |
| 2009/0119144 A1 * | 5/2009 | Goyal | 705/8 |
| 2009/0319905 A1 * | 12/2009 | Loeb et al. | 715/736 |
| 2010/0082499 A1 * | 4/2010 | Luff | 705/317 |

(Continued)

OTHER PUBLICATIONS

Feng Zhao, Jaewon Shin, and James Reich; "Information-Driven Dynamic Sensor Collaboration for Tracking Applications" IEEE Signal Processing Magazine, Mar. 2002.*

(Continued)

*Primary Examiner* — Romain Jeanty
*Assistant Examiner* — Alan S Miller
(74) *Attorney, Agent, or Firm* — Michael A. Springs; Moore & Van Allen PLLC; James C. Edwards

(57) ABSTRACT

Embodiments of the invention relate to systems, methods, and computer program products that provide for a technological infrastructure consumption index. The index is instrumental in measuring and managing technological infrastructure consumption. The consumption index is generated on a predetermined schedule as indicator of a business entity's volume of infrastructure consumption. The consumption index tracks key consumption elements, which are within the control of application teams, thereby insuring that the consumption of the key elements are being managed on an ongoing basis. Additionally, the consumption index provides for drill-down capabilities for the purpose of readily accessing data associated with specific key consumption elements of interest and specific teams/organizations within the business entity.

28 Claims, 8 Drawing Sheets

U.S. PATENT DOCUMENTS

| | | | |
|---|---|---|---|
| 2011/0061014 A1* | 3/2011 | Frader-Thompson et al. | 715/771 |
| 2011/0063126 A1* | 3/2011 | Kennedy et al. | 340/870.02 |
| 2011/0225016 A1* | 9/2011 | Boss et al. | 705/7.25 |

OTHER PUBLICATIONS

Ouri Wolfson and Huabei Yin; "Accuracy and Resource Consumption in Tracking and Location Prediction"; SSTD 2003, LNCS 2750, pp. 325-343, 2003. Springer-Verlag Berlin Heidelberg 2003.*

Sarv Devaraj and Rajiv Kohli; "Performance Impacts of Information Technology: Is Actual Usage the Missing Link?"; Management Science, vol. 49, No. 3 (Mar. 2003), pp. 273-289.*

Ali Bahrami, et al., "Enterprise Architecture for Business Process Simulation," Proceedings of the 1998 Winter Simulation Conference, pp. 1409-1413 (1998).*

Melody A. Rood, "Enterprise Architecture: Definition, Content, and Utility," IEEE, pp. 106-111 (1994).*

Ricardo Chalmeta, et al., "References Architectures for Enterprise Integration," 57 Journal of Systems and Software 175-191 (2001).*

International Search Report and the Written Opinion of the International Searching Authority mailed Jan. 11, 2011 for International Application No. PCT/US 10/56575.

* cited by examiner

TECHNOLOGICAL INFRASTRUCTURE CONSUMPTION INDEX

FIELD

In general, embodiments of the invention relate to methods, systems, apparatus and computer program products for measuring consumption of technology resources within an enterprise business environment and, more particularly, providing for a technological infrastructure consumption index that creates a baseline for technological infrastructure consumption and serves to provide for measurement and management of technological infrastructure consumption.

BACKGROUND

In general, business entities, such as large corporate enterprises and the like, constantly strive to reduce costs. One of numerous cost reduction initiatives is related to reducing technological infrastructure costs, such as costs related to processing data, data storage, personal computing, servers, telecommunications and the like.

Costs associated with the technological infrastructure have two key components; (1) the internal rate charged, which may be defined as the total spent divided by the total capacity and, (2) the volume of infrastructure consumed, otherwise referred to as consumption. In this regard, the cost of the technological infrastructure is defined as the product of the rate times consumption (i.e., cost=rate×consumption). These two cost factors tend to be mutually exclusive in terms of control. For example, a line or business or other entity within a business may only have control over their volume of infrastructure consumption but they do not have control over the rate at which they are charged for the consumption. Conversely, other factors drive rate increases or decreases, which have no correlation on the volume of consumption required.

All too often, business entities make mandates to reduce technology expenses by a prescribed percentage or dollar amount. However, in many instances, while striving to achieve their goals for reducing technology expenses business entities fail to assess all of the key components that drive cost, i.e., rate and consumption, because the necessary granularity in the data, especially in terms of consumption, is not readily and consistently available. Without such readily available and consistent assessment of both rate and consumption, the business entity is unable to gauge whether cost increases or decreases are driven by rate or consumption fluctuations.

In addition, by prescribing percentage or dollar goals for reducing technological infrastructure costs, business entities tend to manage consumption in a traditional dollar/percent goal manner, as if it was equivalent to cost or the only factor in overall cost. In doing so, business entities fail to comprehend that consumption is not the sole driving indicator of infrastructure cost and, moreover, failure to ascertain and comprehend other factors that influence variances in consumption.

Therefore, a need exists to develop a system for measuring and managing technological infrastructure consumption. The desired systems should provide for automatically generating a consistent and readily available indicator of a business entity's volume of consumption. In addition, the system should provide for identifying key consumption elements, which are within the control of application teams, as components of the indicator, thereby insuring that the key consumption elements are being tracked and managed on an ongoing basis. Moreover, the desired systems should provide for an indicator with drill-down capabilities for the purpose of readily accessing data associated with specific key consumption elements of interest. Additionally, the desired system should provide for an indicator that may apply enterprise-wide, as well as indicator's that may be applied to portions of the business-entity, such as lines of business or the like. As a result, the desired system should provide for ease of tracking technological infrastructure consumption across the enterprise and at sub-levels of the enterprise and provide delineation between the volume of technological infrastructure consumed and the internal rate at which the use of the infrastructure is charged.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, apparatus, methods, and computer program products for a technological infrastructure consumption index. The consumption index is generated on a continuous predetermined basis and, thus, serves to manage technological infrastructure consumption. The consumption index tracks key consumption elements, which have been identified through statistical analysis and are within the control of application teams, thereby insuring that the consumption of the all elements, key elements or otherwise, are being managed on an ongoing basis. Additionally, the consumption index provides for drill-down capabilities for the purpose of readily accessing consumption data associated with specific key consumption elements of interest and/or specific teams/organizations within the business entity.

A method for managing consumption of technological infrastructure associated with a business entity defines a first embodiment of the invention. The method includes receiving, at a computing device, consumption data associated with a plurality of key consumption elements. The method further includes determining, at a computing device processor, a consumption index for at least a portion of the business entity based on the consumption data and storing, in computing device memory, the consumption index.

In specific embodiments of the method, receiving the consumption data further includes defining, through statistical analysis, the plurality of key consumption elements from a plurality of business entity consumption elements.

In other specific embodiments of the method, determining the consumption index further includes determining, at the computing device processor, a consumption element score for each of the plurality of key consumption elements and aggregating, at the computing device processor, the consumption element scores to result in the consumption index.

In still further specific embodiments the method includes providing for the consumption index that is baselined in relation to a total cost of the plurality of key consumption elements. In such embodiments of the method, determining the consumption index further includes determining, at the computing device processor, a weighted consumption element score for each of the plurality of key consumption elements and aggregating, at the computing device processor, the weighted consumption element scores to determine the consumption index. The weighted consumption element score is weighted based on a percentage of the total cost of the plurality of key consumption elements.

Additional embodiments of the method include identifying, at a computing device, received consumption data associated with predetermined portions of the business entity, such as a specific organization, team, line of business or the like, determining, at the computing device processor, a consumption index for one or more of the predetermined portions of the business entity based on the identified consumption data. In one specific embodiment identifying received consumption data associated with predetermined portions further includes applying a translator table to the received consumption data to identify portions of the data associated with predetermined portions of the business entity.

Other specific embodiments of the method include receiving, at the computing device consumption related information, such as consumption forecasts, consumption action plans and the like and performing one or more of modifying the consumption index based on the consumption related information or identifying the consumption index as being affected by the consumption related information.

In still further specific embodiments of the method, determining the consumption index further comprises parsing, at the computing device processor, the consumption index into consumption index segments wherein each segment is associated with an organization within the business entity and storing, in computing device memory, the consumption index segments.

An apparatus for managing consumption of technological infrastructure associated with a business entity provides for another embodiment of the invention. The apparatus includes a computing platform including at least one processor and a memory. The apparatus further includes a consumption index module stored in the memory and executable by the processor. The module is configured to receive consumption data associated with a plurality of key consumption elements. The module also includes consumption index logic that is configured to determine a consumption index for at least a portion of the business entity based on the consumption data and store the consumption index in the memory.

In specific embodiments of the apparatus the consumption index module further comprises a key consumption element identifier configured to identify, through statistical analysis, the plurality of key consumption elements from a plurality of business entity consumption elements.

In other specific embodiments of the apparatus, the consumption index logic is further configured to determine a consumption element score for each of the plurality of key consumption elements and aggregate the consumption element scores to result in the consumption index.

In still further embodiments of the apparatus, the consumption index logic is further configured to determine a weighted consumption element score for each of the plurality of key consumption elements and aggregate the weighted consumption element scores to determine the consumption index. The weighted consumption element score is weighted based on a percentage of the total cost of the plurality of key consumption elements and the consumption index is baselined in relation to the total cost of the plurality of key consumption elements.

Other specific embodiments of the apparatus provide for the consumption index module to further include a consumption data organization-identifier configured to identify the organization, team, entity or the like associated with received consumption data. In such embodiments, the consumption index logic is further configured to determine the consumption index for one or more of the predetermined organizations within the business entity based on the identified consumption data. In one such embodiment the consumption data organization-identifier is further configured to apply a translator table to the received consumption data to identify organization, team, entity associated with the received consumption data.

In still further specific embodiments the apparatus, the consumption index module includes a consumption index impacter configured to receiving consumption related information, such as forecast data, action plans or the like and perform one or more of modifying the consumption index based on the consumption related information or identifying the consumption index as being impacted by the consumption related information.

Additionally, in further embodiments, the consumption index module further includes a consumption index presentation application configured to present a consumption index meter to a user via a computing device. Additionally, the presentation application may be configured to present at least one of a key consumption element breakdown of the consumption index, an organization breakdown of the consumption index or a key consumption element and organization breakdown of the consumption index.

A computer program product that includes a computer-readable medium defines yet another embodiment of the invention. The medium includes a first set of codes for causing a computer to receive consumption data associated with a plurality of key consumption elements. Additionally, the medium includes a second set of codes for causing a computer to determine a consumption index for at least a portion of the business entity based on the consumption data and a third set of codes for causing a computer to store the consumption index.

Thus, systems, apparatus, methods, and computer program products described in detail below provide for a technological infrastructure consumption index. The consumption index is generated on a continuous predetermined schedule to allow for management of technological infrastructure consumption. The consumption index tracks key consumption elements, which are within the control of application teams, thereby insuring that the consumption of the key elements are being managed on an ongoing basis. Additionally, the consumption index provides for drill-down capabilities for the purpose of readily accessing data associated with specific key consumption elements of interest and specific teams/organizations within the business entity.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
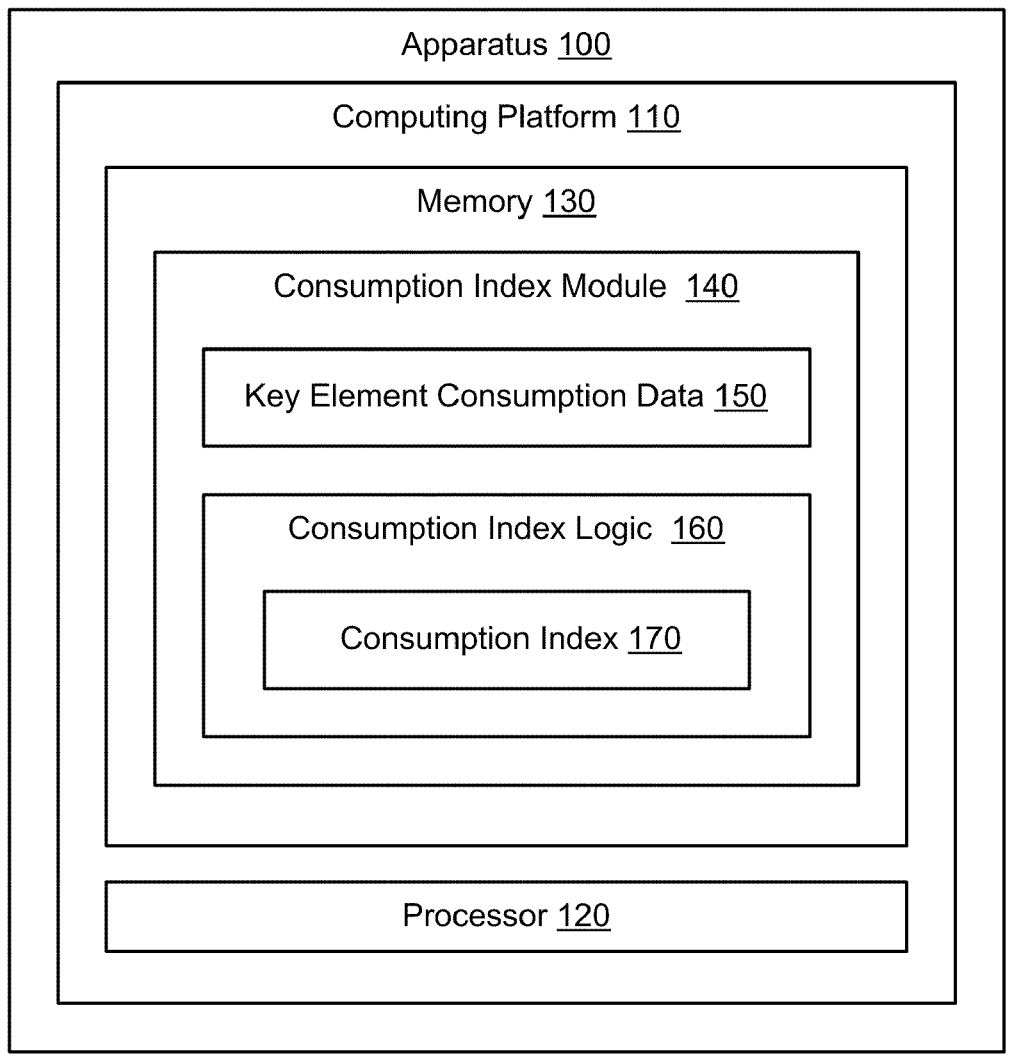
Figure 2:
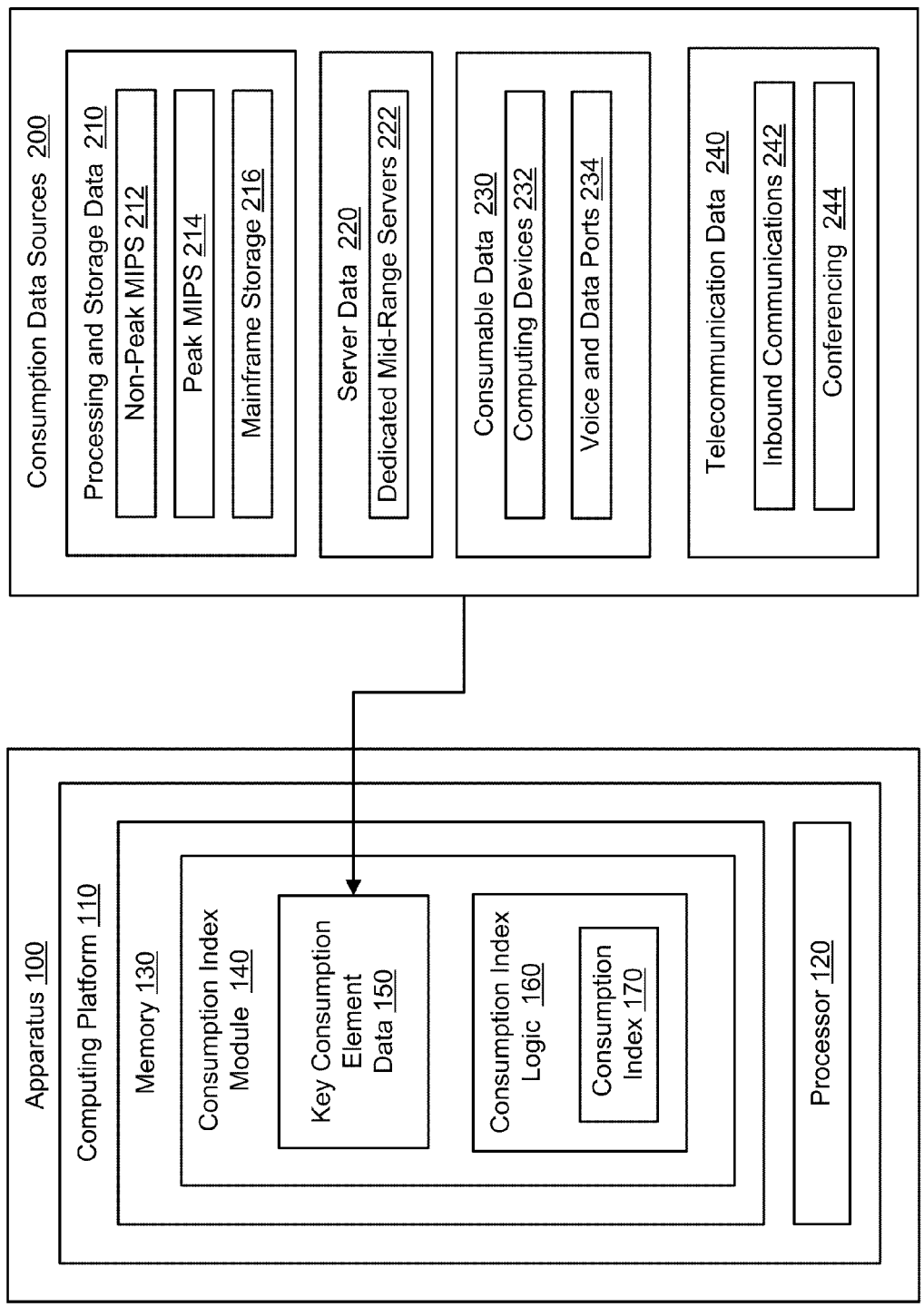
Figure 3:
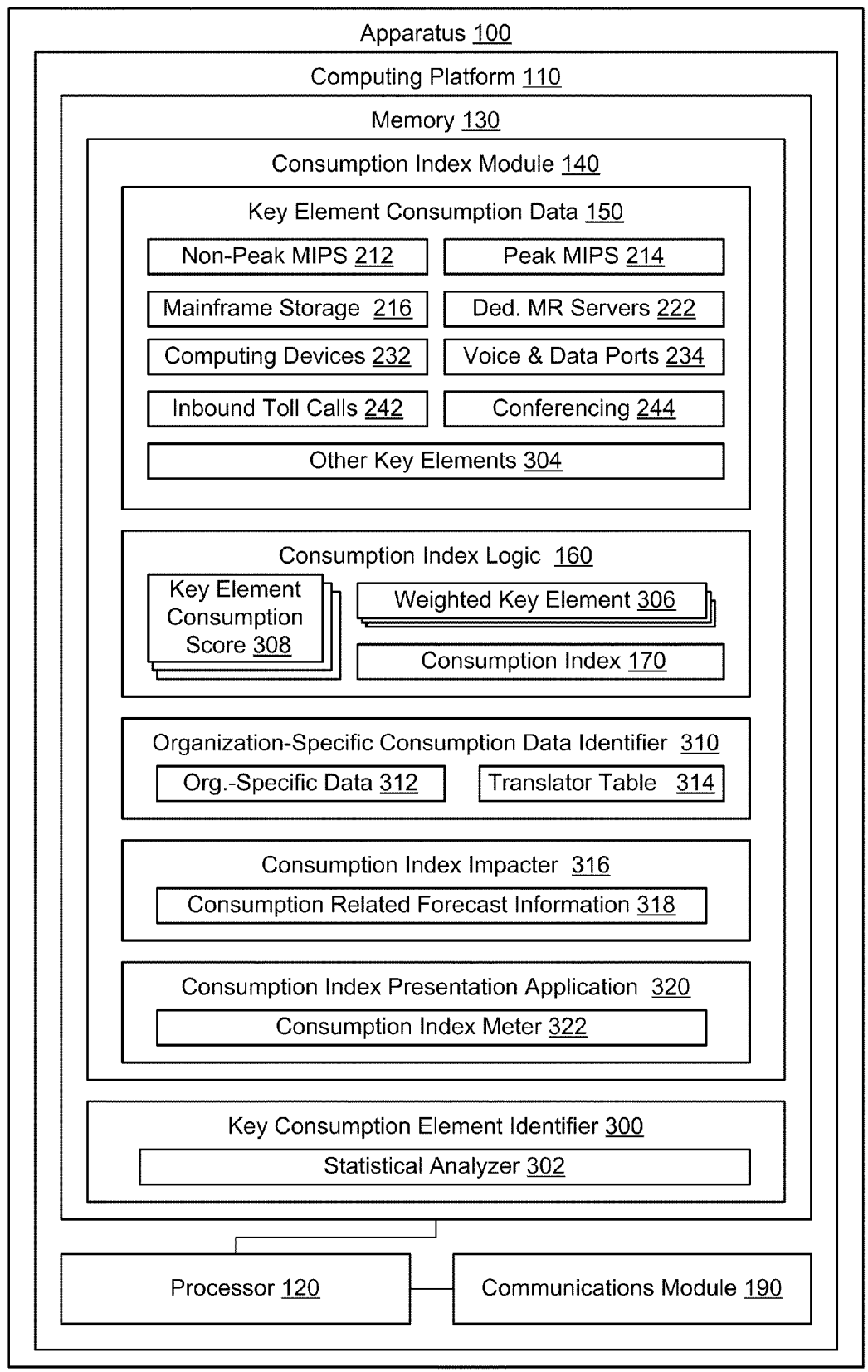
Figure 4:
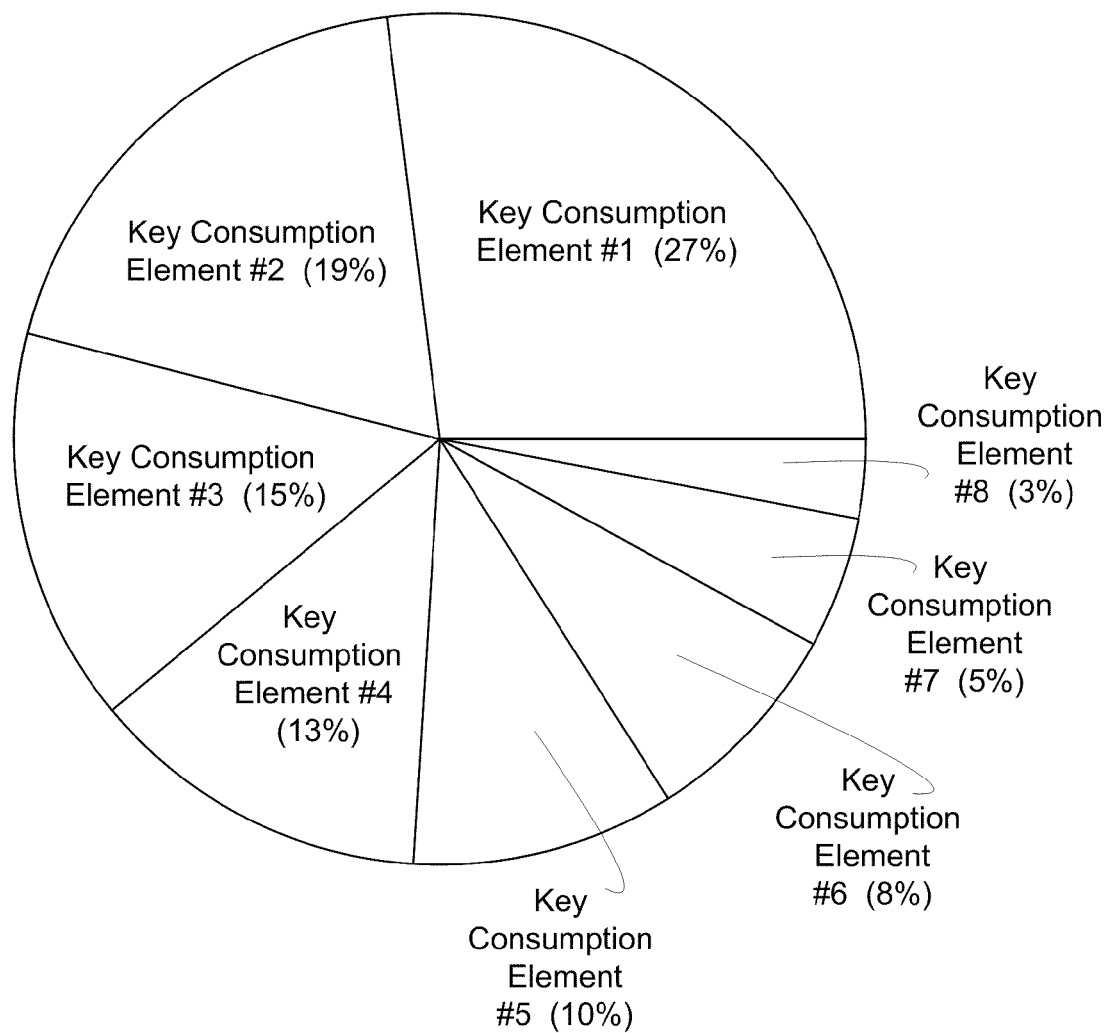
Figure 5:
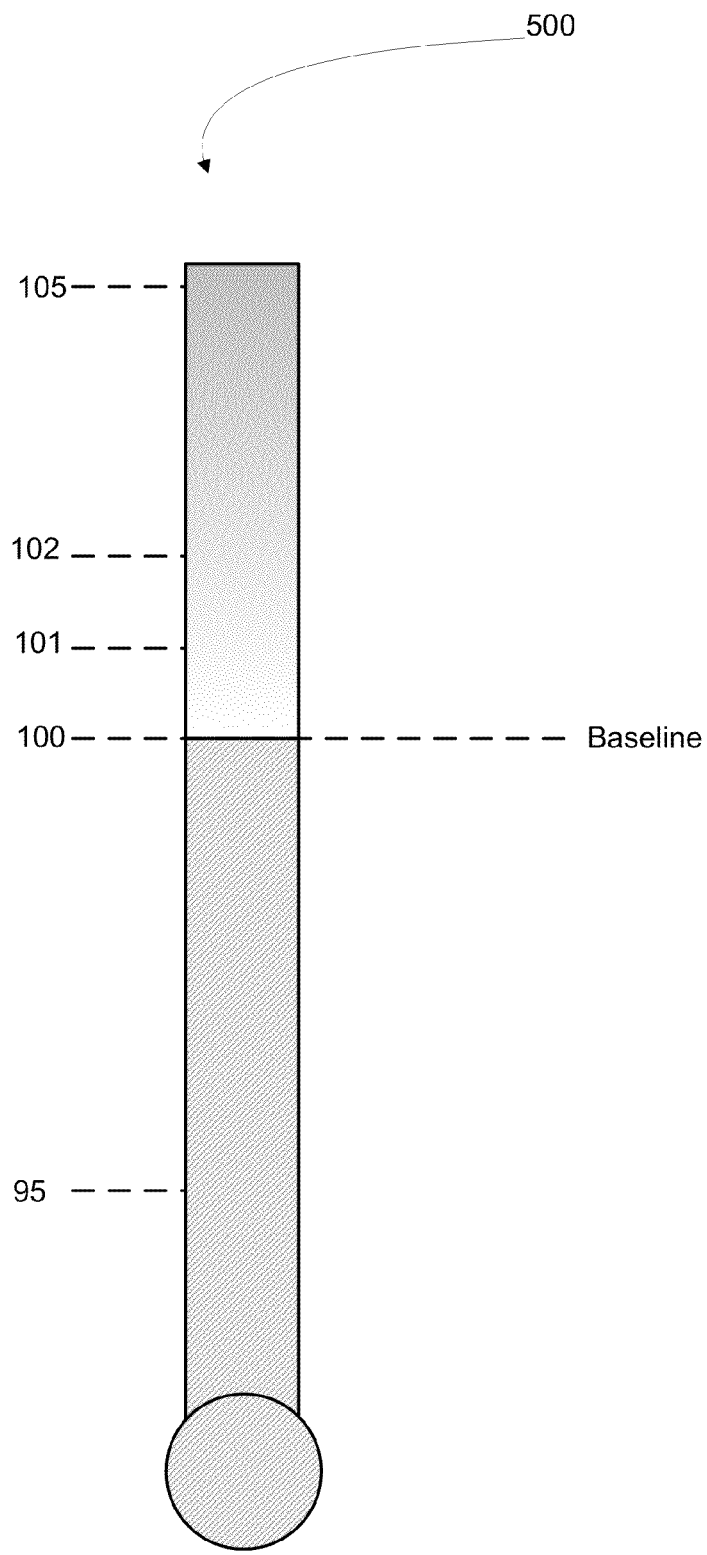
Figure 6:
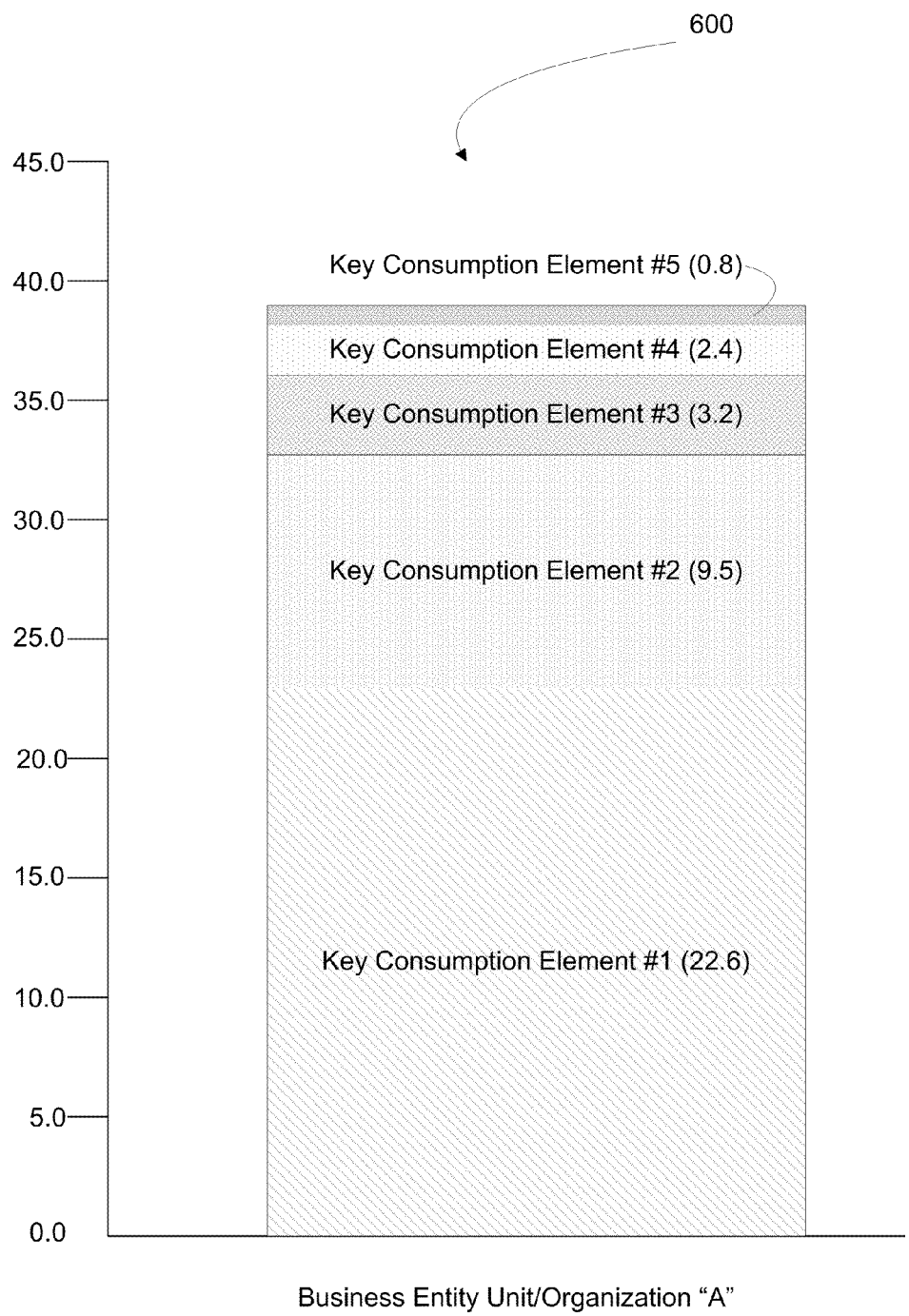
Figure 7:
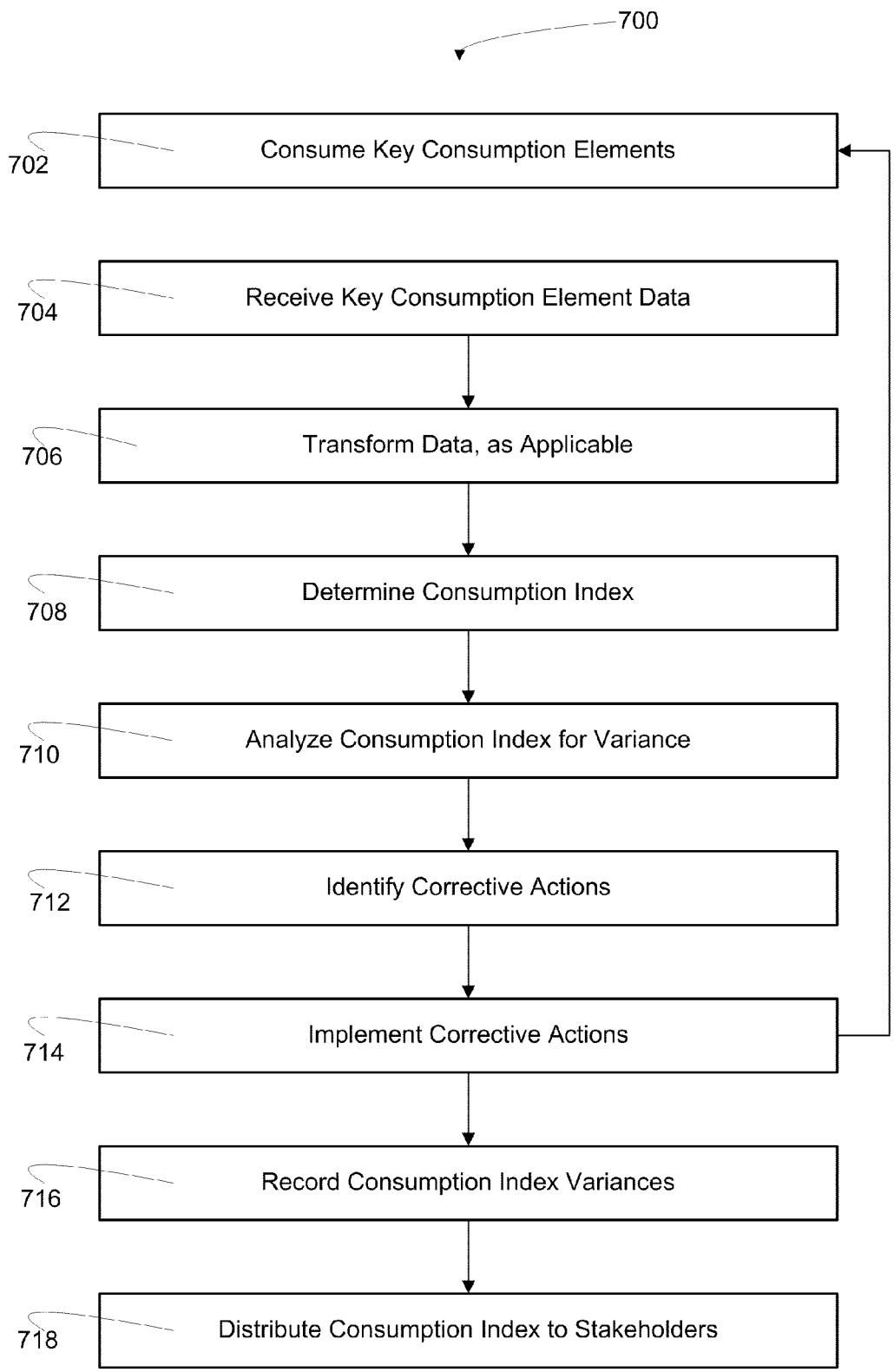
Figure 8:
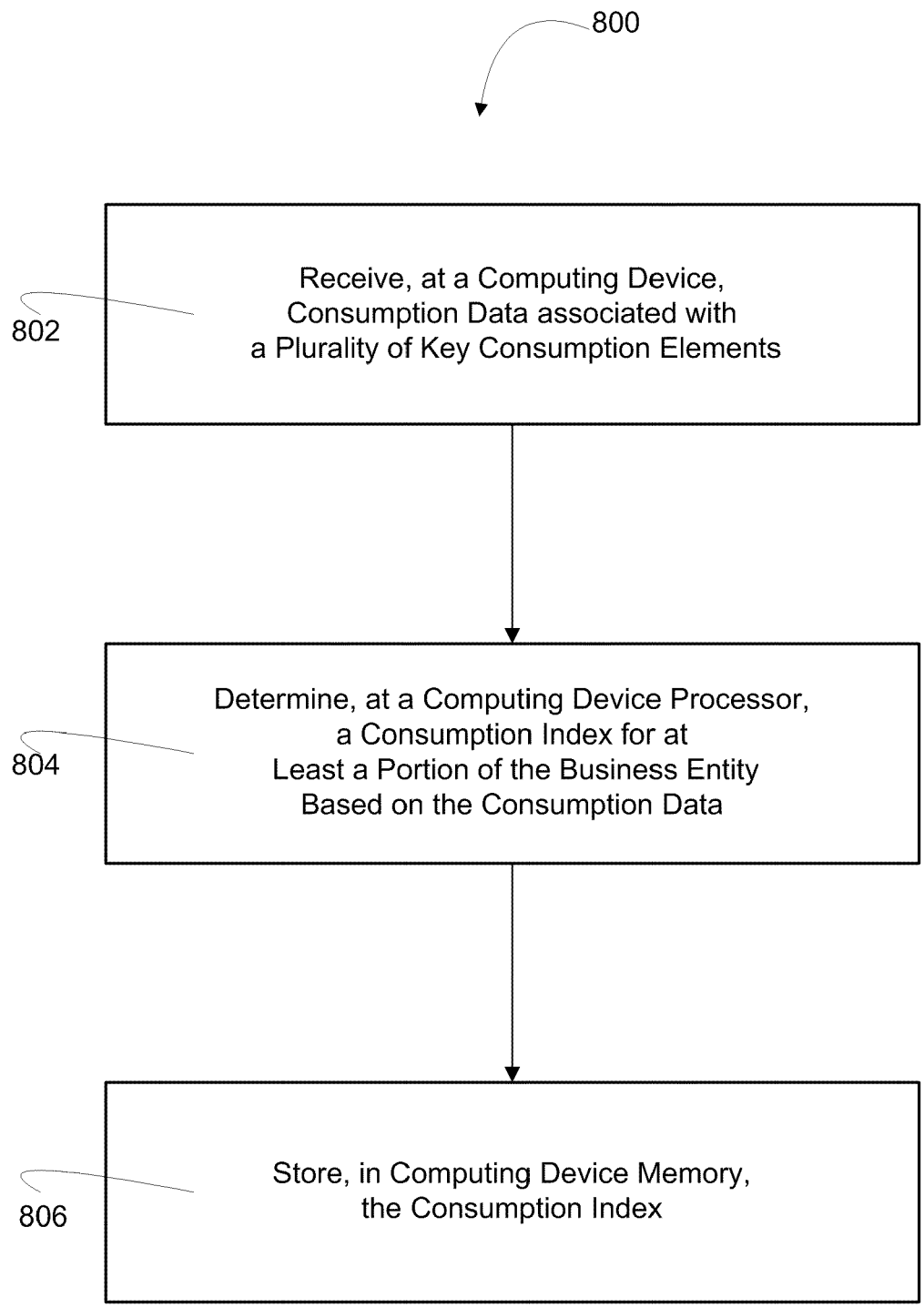

Having thus described embodiments of the invention in general terms, reference will now be made to the accompanying drawings, which are not necessarily drawn to scale, and wherein:

FIG. 1 is a block diagram of an apparatus for tracking and managing technological infrastructure consumption, in accordance with embodiments of the present invention;

FIG. 2 is a block diagram illustrating consumption data sources for identified key consumption elements, in accordance with embodiments of the present invention;

FIG. 3 is a detailed block diagram of an apparatus for tracking and managing technological infrastructure consumption, in accordance with another embodiment of the invention;

FIG. 4 is a pie chart depicting an exemplary breakdown of the weighting of key consumption elements used in a consumption index, in accordance with embodiments of the present invention;

FIG. 5 is a example of a consumption index meter, in accordance with an embodiment of the present invention;

FIG. 6 is a bar graph illustrating a breakdown of a consumption index by business entity organization and key element consumptions for the business entity organizations, in accordance with embodiments of the present invention;

FIG. 7 is a flow diagram of a method for tracking and managing technological infrastructure consumption in a business entity; in accordance with embodiments of the present invention; and FIG. 8 is a flow diagram of another method for managing technological infrastructure consumption in a business entity; in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Thus, present embodiments herein disclosed provide for a technological infrastructure consumption index. The consumption index serves as an indicator of the volume of infrastructure being consumed within a business entity or a designated portion of the business entity. The consumption index is generated on an ongoing and predetermined schedule, such as monthly or the like to provide management with an easily identifiable indication of infrastructure consumption. The consumption index tracks key consumption elements, which have been identified through statistical analysis as the elements most affecting infrastructure consumption and within the control of application teams. By tracking these key consumption elements the index insures that the overall consumption of all elements of the infrastructure are being managed accordingly. Additionally, the consumption index provides for drill-down capabilities for the purpose of readily accessing and managing consumption data associated with specific key consumption elements of interest and specific teams/organizations within the business entity.

Referring to FIG. 1 a block diagram is depicted of an apparatus 100 for tracking and managing technological infrastructure consumption within a business entity, in accordance with an embodiment of the present invention. Technological infrastructure includes all facets of a business entities information technology environment, including but not limited to, hardware, such as mainframes (i.e., processing capabilities), servers, storage devices, personal computers and the like; telecommunications and the like. The apparatus 100 may be embodied in one or more devices; in multiple device embodiments the devices work in unison to provide tracking and management of technological infrastructure consumption. Apparatus 100 includes a computing platform 110 that includes at least one processor 120 and a memory 130.

The memory 130 of apparatus 100 stores a consumption index module 140 that is configured to track and manage technological infrastructure consumption through a measurable consumption indicator, otherwise referred to herein as the consumption index. Technological infrastructure consumption is measurable and is based on volumes consumed. Tracking and managing technological infrastructure consumption delineates the accountability of managing consumption from managing the other cost factor, the usage rate.

The technological index module 140 is configured to receive key element consumption data 150 from consumption data sources as shown and described in FIG. 2, infra. In accordance with embodiments of the invention, key consumption elements are initially identified as the key usage elements within the business entity or, if the consumption index is associated with a portion of the business entity, for example a line of business within the business entity, within that particular portion of the business entity. The key consumption elements are identified based on the volume of consumption associated with these elements being reflective of the overall consumption of the technological infrastructure within the business entity or the associated portion of the business entity. In this regard, by tracking and managing consumption of the key elements, the consumption index serves to manage consumption throughout the business entity and/or portions of the business entity. In specific embodiments of the invention, statistical analysis is performed to identify the key consumption elements. It should be noted that key consumption elements are re-evaluated on an ongoing basis, such as annual or the like, to assess their significance in terms of their respective effect on the consumption index. As part of the re-evaluation the defined key consumption elements may change over time, certain previous identified and tracked elements may be eliminated from the consumption index while other key consumption elements may added to the consumption index.

The key element consumption data 150 may be received by the consumption index module 140 on a predetermined schedule, such as monthly or the like, or on an as-needed basis. While in other instance, receiving the key element consumption data 150 may include accessing various databases and/or data sources to capture/retrieve the data on a predetermined schedule, such as monthly or the like, or on an as-needed basis.

The consumption index module 140 additionally includes consumption index logic 160 that is configured to determine a consumption index 170 based on the key element consumption data 150. The consumption index logic 160 may be embodied in hardware, software or a combination of hardware and software. In specific embodiments of the invention, the consumption index logic 160 may be configured to provide for an enterprise-wide consumption index based on enterprise-wide key element consumption data or the logic 160 may be configured to provide for one or more consumption indices associated with a portion of the business entity, such as a line of business, organization, team or the like, based on key element consumption data associated with the respective portion of the business entity.

As discussed in more detail infra. and in accordance with specific embodiments of the invention, the consumption index is baselined to a predetermined number, for example one hundred, one thousand or the like and each of the key consumption elements are weighted in relation to the baseline based on the key elements proportion to the total cost of all the key elements. In this regard, each of the key consumption elements has index sensitivity in relation to the baselined consumption index. The index sensitivity being a specified volume associated with each key consumption element if the index moves up or down a specified amount and movement of the index is solely attributed to that particular key consumption element.

Referring to FIG. 2 a block diagram is depicted that includes the apparatus 100 of FIG. 1 and the consumption data sources 200 that provide the key consumption element data 150 used to determine the consumption index 170, in accordance with embodiments of the present invention. Thus, consumption data sources 200 may include, but are not limited to, processing and storage data 210, server data 220, consumable data 230 and telecommunications data 240. It should be noted that the consumption data sources may vary from business entity-to-business entity and/or from one portion of a business entity to another portion of a business entity depending on the identified key consumption elements. In the illustrated example of FIG. 2, the identified key consumption elements are associated with the illustrative data sources, specifically processing and storage data 210, server data 220, consumable data 230 and telecommunications data 240.

In the illustrated example of FIG. 2 the business identity or portion of a business entity has identified eight key consumption elements from amongst all of the business entities or portion of the business entities technological infrastructure consumption elements. As previously, noted the number of key consumption elements that are included in the index will vary from business entity-to-business entity, amongst portions/segments of the business entity and over time. Thus, the number "eight" in the illustrated embodiment and the identified key consumption elements are by way of example only. Additionally, as previously noted, the key consumption elements are identified based on their consumption volumes being reflective of the overall consumption of the technological infrastructure for the business entity or the portion of the business entity. In specific embodiments, statistical analysis is implemented to identify the key consumption elements. For example, Pareto-type analysis may be implemented to identify the 20% of the elements that represent 80% of the total cost. In addition, a combination of regression and affinitization type analysis may be implemented to determine and refine best fit categories. In one embodiment of the invention, step-wise regression type statistical analysis is applied to specific technological infrastructure elements, such telecommunication elements and consumable elements. Key elements within the telecommunication and consumable elements are identified based of a coefficient of determination ($R^2$) greater than 96%. In addition, affinitization analysis is performed on best fit categories to determine best key element subsets.

Thus, processing and storage data 210 includes exemplary identified key element consumption data for non-peak MIPS (Million Instructions Per Second) 212, peak MIPS 214 and mainframe storage 216. Non-peak MIPS 212 and peak MIPS 214 are defined in terms of the hours of use and mainframe storage is defined in terms of a storage unit, such as a gigabyte or the like. Server data 220 includes exemplary identified key element consumption data for dedicated mid-range servers 222 defined in terms of the number of servers implemented. Consumable data 230 includes exemplary identified key element consumption data for computing devices 232, such as Personal Computers (PCs) and the like, and voice and data ports 234. Computing devices 232 are defined in terms of the number of computing devices implemented and voice and data ports 234 are defined in terms of the number of voice and data ports implemented. Telecommunications data 240 includes exemplary identified key element consumption data for inbound communications 244, such as inbound toll-free telephone calls, and conferencing 246, such as audio, video or other multimedia conferencing. Inbound communications and conferencing are defined in terms of minutes.

FIG. 3 provides a more detailed depiction of an apparatus 100, according to further embodiments of the present invention. In addition to providing greater detail, FIG. 3 highlights various optional components/embodiments not shown in FIG. 1. The apparatus 100 may include any type and/or combination of one or more computing devices, such as servers, personal computers, or the like. The apparatus 100 includes computing platform 110 that is operable to receive and execute modules, routines and applications, such as impacted business consumption index module 140 or the like. Computing platform 110 includes memory 130, which may comprise volatile and nonvolatile memory such as read-only and/or random-access memory (RAM and ROM), EPROM, EEPROM, flash cards, or any memory common to computing platforms. Further, memory 130 may include one or more flash memory cells, or may be any secondary or tertiary storage device, such as magnetic media, optical media, tape, or soft or hard disk.

Further, computing platform 110 also includes processor 120, which may be an application-specific integrated circuit ("ASIC"), or other chipset, processor, logic circuit, or other data processing device. Processor 120 or other processor such as ASIC may execute an application programming interface ("API") layer that interfaces with any resident programs, such as consumption index module 140 or the like, stored in the memory 120 of apparatus 100.

Additionally, processor 120 includes various processing subsystems embodied in hardware, firmware, software, and combinations thereof, that enable the functionality of apparatus 100 and the operability of the apparatus on a network. For example, processing subsystems allow for initiating and maintaining communications, and exchanging data, with other networked devices. It should be noted that any of the modules, sub-modules, applications, logic and routines shown and described as being in memory 130 may alternatively be embodied in processing subsystems.

The memory 130 of apparatus 100 includes the aforementioned consumption index module 140 configured to track and manage technological infrastructure consumption through use of a consumption index 170. The memory of apparatus 100 may optionally include key consumption element identifier 300 that is configured to identify key consumption elements that comprise the consumption index. The identifier may include a statistical analyzer 302 that uses Pareto-type analysis, regression, and affinitization to automatically identify key consumption elements or candidates for key consumption elements. The key consumption element identifier 300 may be implemented at the inception of the technological infrastructure consumption management program and/or periodically, such as annual, to re-assess and re-define key consumption elements and/or on an as-needed basis, such as when an enterprise business entity adds or subtracts portions of the business entity (e.g., acquires a new business/division/subsidiary or sells-off/eliminates a business/division/subsidiary).

As previously discussed, consumption index module 140 is configured to receive key element consumption data 150 via communications module 190. In one specific embodiment, the key element consumption data 150 includes, non-peak MIPS data 212, peak MIPS data 214, mainframe storage data 216, dedicated mid-range server data 222, computing device data 232, voice and data port data 234, inbound communications data 242, conferencing data 244 and any other key element data 304. As previously noted, key element consumption data is specific to the business entity or portion of the business entity associated with the consumption index. Further, key element consumption data may vary over time based on re-evaluation of the key consumption elements that are included within the consumption index. Hence, the illustrated examples of key element consumption data 150 are by way of example only. The other key element data 304 reflects data of other key consumption elements that may be identified as comprising the consumption index 170, either at the inception of the system or over time as the system is re-assessed and refined.

The consumption index module 140 includes consumption index logic 160 that is configured to determine a consumption index 170 based on the key element consumption data 150. As previous noted, the key consumption elements may be weighted key consumption elements 306 that are weighted in relation to a consumption index baseline based on the key elements proportion to the total cost of all the key elements. For example, if the consumption index is baselined to one hundred, the key consumption elements will be weighted such that aggregate sum of the weighted portions equals the baseline value, one hundred. The percentage of the baseline allocated to each key consumption element (i.e., the weight) may be determined based on the overall total spend (cost× units) of the key consumption element.

FIG. 4 depicts a pie graph showing an exemplary allocation of weighting for key consumption elements. In the illustrated example, eight key consumption elements have been identified as comprising the consumption index 170, however, it should be noted, that more or less key consumption elements may comprise the consumption index. In the illustrated example, based on the overall total spend (cost×unit) of the key consumption element for a designated period of time, for example of a year, key consumption element No. 1 is assigned a weight of 27% of the consumption index, key consumption element No. 2 is assigned a weight of 19% of the consumption index, key consumption element No. 3 is assigned a weight of 15% of the consumption index, key consumption element No. 4 is assigned a weight of 13% of the consumption index, key consumption element No. 5 is assigned a weight of 10% of the consumption index, key consumption element No. 6 is assigned a weight of 8% of the consumption index, key consumption element No. 7 is assigned a weight of 4% of the consumption index, key consumption element No. 8 is assigned a weight of 1% of the consumption index and key consumption element No. 9 is assigned a weight of 1% of the consumption index. The weighting values may be re-evaluated and reassigned on a predetermined schedule, such as annually, or on an as-needed basis, due to acquisitions, mergers or the like.

Returning the reader's attention to FIG. 3, in accordance with other specific embodiments of the invention the consumption index logic 160 is configured to determine a key element consumption score 308 for each of the key elements and aggregate the key element consumption scores as a means of determining the consumption index 170. In further embodiments, the key element consumption score 308 is a weighted key element consumption score. For example, if a key consumption element, such as non-peak MIPS, is assigned a weight of 27% of the overall consumption index and index sensitivity (i.e., a one point movement up or down of the consumption index) for non-peak MIPS is 342,100 MIPS hours, the weighted consumption score for non-peak MIPS for a specified consumption index period may be 25 (i.e., 27−2) if the non-peak MIPS decreased by 684,200 hours during the specified consumption index period.

Additionally, consumption index module 140 may include organization-specific consumption data identifier 310 that is configured to identify organization-specific consumption data 312 associated with a designated organization, team, line of business or any other designated portion of the business entity, in the instance in which the consumption index logic 160 is configured to determine a consumption index that is specific to that particular organization, team, line of business or any other designated portion of the overall business entity. In one such embodiment, the identifier 310 may implement a translator table 314 or the like that serves to identify the organization, team, line of business or the like associated with the consumption data. It should be noted that while the organization-specific consumption data identifier 310 is illustrated and described as being included within the consumption index module 140, in other embodiments it may reside external from the consumption index module 140. In such embodiments, the specified portion of the business entity to which the consumption data is associated, is identified prior to the data being received by the consumption index module 140.

In addition, consumption index module 140 may include consumption index impacter 316 this is configured to receive consumption related forecast/impact data 318, such as consumption index forecasts, previous identified action plans based on the consumption index or consumption index variances and the like. Based on the forecast impact data 318, the impacter 316 may perform a predetermined action. The predetermined action may include, but is not limited to, modify the consumption index, identify the consumption index as being affected/impacted by the forecast/impact data 318 or recommend further correct action plans based on variances in the current correct action to a forecasted consumption index. It should be noted that while the consumption index impacter 316 is illustrated and described as being included within the consumption index module 140, in other embodiments it may reside external from the consumption index module 140.

In accordance with other specific embodiments, consumption index module 140 includes consumption index presentation application 320 that is configured to provide, via a communication network, a user interface for presenting a consumption index meter 322 and other information related to the consumption index. The application 320 may be a Graphical User Interface (GUI) application accessible via the Internet, an intranet or the like. An exemplary consumption index meter 500 is depicted in FIG. 5. The meter 500, as shown indicates a consumption index baseline of one-hundred (100). Thus, a consumption index above 100 indicates that consumption is above the baseline and a consumption index below 100 indicates that consumption is below the baseline. The consumption index meter 500 provides a user, such as a key stakeholder or the like, a readily available and easily ascertainable indication of the current state of technological infrastructure consumption.

In addition to the consumption index meter, application 320 may provide for presentation of other information related to the consumption index. For example, the application may be configured to provide a user drill-down capability, whereby the consumption index is broken down based on portions of the business entities, such as applications, teams, organizations or the like. It should be noted that if the consumption index itself is associated with a specific applications, teams, organizations or the like, the drill down capability may provide for further partitioning of the consumption index based on lower hierarchy within an application, team, organization or the like.

FIG. 6 provides an example of a bar graph 600 that may be presented by consumption index presentation application 320, in accordance with an embodiment of the present invention. The 38.5 of the overall consumption index is attributable to business entity unit/organization/team/line of business "A". The bar graph 600 further provides for a breakdown of the consumption index associated with business entity unit/organization/team/line of business "A" by key consumption element type. Thus, 22.6 of the organization portion of the consumption index is attributed to key consumption element No. 1, 9.5 of the organization portion of the consumption index is attributed to key consumption element No. 2, 3.2 of the organization portion of the consumption index is attributed to key consumption element No. 3, 2.4 of the organization portion of the consumption index is attributed to key consumption element No. 4 and 0.8 of the organization portion of the consumption index is attributed to key consumption element No. 5. Such drill-down capabilities allow business entity management and/or key stakeholders to readily identify causes of fluctuation/variance in consumption index based on organization, team, line of business or the like and key consumption element within an organization, team, line of business or the like.

Referring to FIG. 7 a flow diagram is provided of a method 700 for tracking and managing technological infrastructure consumption, in accordance with embodiments of the present invention. At Event 702, key consumption elements are consumed during a designated period of time, such as month. The designated period of time will define the interval in which the consumption index is updated/revised.

At Event 704, the key element consumption data is received or otherwise collected from data stores, repositories or the like. The receipt or collection of the data typically transpires on a predetermined schedule, for example a predetermined date/time of month, to provide for determining the consumption index on a corresponding schedule. At Event 706, the received key element consumption data is transformed, as applicable. In specific embodiments transformation may include formatting the data for the purpose of identifying the consumption associated with the data. In other instances, transformation may include applying the designated weighting factor to the consumption data to determine a key element consumption score or the like. In instances in which the consumption index being determined is for a portion of the business entity, transformation may provide for the consumption data to be identified based on the portion of the business entity to which it is associated.

At Event 708, the consumption index is determined. In accordance with embodiments previously discussed, determining the consumption index may include one or more of applying a predetermined weight factor to the key element consumption data, determining key element consumption scores, and/or aggregating the consumption scores to result in the consumption index. As previously noted, the consumption index is typically configured to be determined on a predetermined schedule, such as monthly or the like. In other instances, the consumption index may be determined on an as-needed basis or, if the consumption data is received proximate in time to the consuming action, the consumption index may be continually determined, so as to result in a real-time or proximate real-time consumption index.

Once the consumption index has been determined, at Event 710, the consumption index is analyzed for variance. The variance analysis may be compared to previous consumption indices, comparison to forecasts or any other analysis associated with a variance. If variances are identified, at Event 712, proper corrective actions are identified and, at Event 714, actions are taken or a corrective action plane is devised and initiated. Once the corrective actions are taken, the method returns to Event 702, where further key element consumption ensues. In addition, at Event 716, consumption index variances are recorded and stored in an associated database and, at Event 718, the consumption index is distributed to business entity management, key stakeholders and the like. In specific embodiments, distribution of the consumption index may provide for network-accessible presentation of the index and/or consumption index meter via a GUI application or the like.

FIG. 8 provides for a flow diagram of another method 800 for managing technological infrastructure consumption within a business entity. At Event 802, consumption data associated with a plurality of key consumption elements is received or otherwise collected at a computing device. The key consumption elements having been previously identified as having a collective consumption reflective of the overall consumption of the associated technological infrastructure. In one embodiment, the key consumption elements are identified through statistical analysis.

At Event 804, a consumption index is determined, at a computing device processor, for at least a portion of the business entity based on the consumption data. In this regard, the consumption index may be determined enterprise-wide of for any designated portion, business unit, line of business, organization or the like of the business entity. In specific embodiments, the consumption index is determined based on determining weighted key element consumption scores and aggregating the scores to result in the consumption index. In such embodiments the key elements are weighted based on the overall total spend (cost×number of units) of the key elements and the scoring is in proportion to the consumption index baseline value.

At Event 806, the consumption index is stored in computing device memory. In specific embodiments, the consumption index is analyzed for variance, corrective actions identified and taken and the variance is stored in the memory. Additionally, in other embodiments, the consumption index is distributed to business entity management, key stakeholders and the like.

Thus, systems, apparatus, methods, and computer program products herein described provide a technological infrastructure consumption index. The index is instrumental in measuring and managing technological infrastructure consumption. The consumption index is generated on a predetermined schedule as indicator of a business entity's volume of infrastructure consumption. The consumption index tracks key consumption elements, which are within the control of application teams, thereby insuring that the consumption of the key elements are being managed on an ongoing basis. Additionally, the consumption index provides for drill-down capabilities for the purpose of readily accessing data associated with specific key consumption elements of interest and specific teams/organizations within the business entity.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for managing consumption of technological infrastructure associated with a business entity, the method comprising:
    defining, through statistical analysis performed by a computing device processor, a plurality of key consumption elements from amongst a plurality of business entity consumption element;
    receiving, by a computing device, consumption data associated with the plurality of key consumption elements;
    determining, by a computing device processor, a consumption index for at least a portion of the business entity based on the consumption data, wherein determining the consumption index further comprises determining a weighted consumption element score for each of the plurality of key consumption elements, wherein the weighted consumption element score is weighted based on a percentage of the total cost of the plurality of key consumption;
    storing, in computing device memory, the consumption index; evaluating, on an ongoing basis by a computing device processor, the key consumption elements and other business entity consumption elements not currently defined as key consumptions elements to determine their respective relevancy to the consumption index; and
    providing for one or more of (1) adding one or more of the other business entity consumption elements to the consumption index or (2) deleting one or more of the key consumption elements from the consumption index based on the evaluation of relevancy to the consumption index.

2. The method of claim 1, wherein determining the consumption index further comprises determining, by the computing device processor, a consumption element score for each of the plurality of key consumption elements.

3. The method of claim 2, wherein determining a consumption index further comprises aggregating, by the computing device processor, the consumption element scores to result in the consumption index.

4. The method of claim 1, further comprising providing for the consumption index that is baselined in relation to a total cost of the plurality of key consumption elements.

5. The method of claim 1 wherein determining the consumption index further comprises aggregating by the computing device processor, the weighted consumption element scores to determine the consumption index.

6. The method of claim 1, further comprising identifying, by a computing device, received consumption data associated with predetermined portions of the business entity and wherein determining the consumption index further comprises determining, at the computing device processor, consumption index for one or more of the predetermined portions of the business entity based on the identified consumption data.

7. The method of claim 6, wherein identifying further comprises applying, by a computing device processor, a translator table to the received consumption data to identify portions of the data associated with predetermined portions of the business entity.

8. The method of claim 1, further comprising receiving, by the computing device, consumption related information and performing one or more of modifying the consumption index based on the consumption related information or identifying the consumption index as being affected by the consumption related information.

9. The method of claim 1, wherein determining the consumption index further comprises parsing, by the computing device processor, the consumption index into consumption index segments wherein each segment is associated with an organization within the business entity and storing, in computing device memory, the consumption index segments.

10. An apparatus for managing consumption of technological infrastructure associated with a business entity, the apparatus comprising: a computing platform including at least one processor and a memory; and
a key consumption element identifier stored in the memory, executable by the processor and configured to identify, through statistical analysis, a plurality of key consumption elements from amongst a plurality of consumption elements;
a consumption index module stored in the memory and executable by the processor, wherein the module is configured to receive consumption data associated with the plurality of key consumption elements and wherein the module includes:
consumption index logic that is configured to determine a consumption index for at least a portion of the business entity based on the consumption data and store the consumption index in the memory, wherein the consumption index logic is further configured to determine a weighted consumption element score for each of the plurality of key consumption elements, wherein the weighted consumption element score is weighted based on a percentage of the total cost of the plurality of key consumption elements; and
a key consumption element evaluator configured to evaluate, on an ongoing basis, the key consumption elements and other business entity consumption elements not currently defined as key consumptions elements to determine their respective relevancy to the consumption index and provide for one or more of (1) adding one or more of the other business entity consumption elements to the consumption index or (2) deleting one or more of the key consumption elements from the consumption index based on the evaluation of relevancy to the consumption index.

11. The apparatus of claim 10, wherein the consumption index logic is further configured to determine a consumption element score for each of the plurality of key consumption elements.

12. The apparatus of claim 11, wherein the consumption index logic is further configured to aggregate the consumption element scores to result in the consumption index.

13. The apparatus of claim 10, wherein the consumption index module is further configured to determine the consumption index, wherein the consumption index is baselined in relation to a total cost of the plurality of key consumption elements.

14. The apparatus of claim 10 wherein the consumption index logic is further configured to aggregate the weighted consumption element scores to determine the consumption index.

15. The apparatus of claim 10, wherein the consumption index module further comprises a consumption data organization-identifier configured to identify consumption data associated with predetermined organizations within the business entity and wherein the consumption index logic is further configured to determine the consumption index for one or more of the predetermined organizations within the business entity based on the identified consumption data.

16. The apparatus of claim 15, wherein the consumption data organization-identifier is further configured to apply a translator table to the received consumption data to identify consumption data associated with predetermined organizations within the business entity.

17. The apparatus of claim 10, wherein the consumption index module further comprises a consumption index impacter configured to receiving consumption related information and perform one or more of modifying the consumption index based on the consumption related information or identifying the consumption index as being impacted by the consumption related information.

18. The apparatus of claim 10, wherein the consumption index logic is further configured to parse at the computing device processor, the consumption index into consumption index segments wherein each segment is associated with an organization within the business entity and storing, in computing device memory, the consumption index segments.

19. The apparatus of claim 10, wherein the consumption index module further comprises a consumption index presentation application configured to present the consumption index to a user via a computing network.

20. The apparatus of claim 10, wherein the consumption index presentation application is further configured to present at least one of a key consumption element breakdown of the consumption index, an organization breakdown of the consumption index or a key consumption element and organization breakdown of the consumption index.

21. A computer program product comprising:
a non-transitory computer-readable medium comprising:
a first set of codes for causing a computer to define, through statistical analysis, a plurality of key consumption elements from amongst a plurality of business entity consumption elements;
a second set of codes for causing a computer to receive consumption data associated with the plurality of key consumption elements;
a third set of codes for causing a computer to determine a consumption index for at least a portion of the business entity based on the consumption data, wherein the third set of codes is further configured to cause the computer to determine a weighted consumption element score for each of the plurality of key consumption elements, wherein the weighted consumption element score is weighted based on a percentage of the total cost of the plurality of key consumption elements and the consumption index is baselined in relation to a total cost of the plurality of key consumption elements; and
a fourth set of codes for causing a computer to store the consumption index;
a fifth set of codes for causing a computer to evaluate, on an ongoing basis, the key consumption elements and other business entity consumption elements not currently defined as key consumptions elements to determine their respective relevancy to the consumption index; and a sixth set of codes for causing a computer to provide for one or more of (1) adding one or more of the other business entity consumption elements to the consumption index or (2) deleting one or more of the key consumption elements from the consumption index based on the evaluation of relevancy to the consumption index.

22. The computer program product of claim 21, wherein the third set of codes is further configured to cause the computer to determine a consumption element score for each of the plurality of key consumption elements.

23. The computer program product of claim 22, wherein the third set of codes is further configured to cause the computer to aggregate the consumption element scores to result in the consumption index.

24. The computer program product of claim 21 wherein the third set of codes is further configured to cause the computer to aggregate the weighted consumption element scores to determine the consumption index.

25. The computer program product of claim 21, further comprising a seventh set of codes for causing a computer to identify received consumption data associated with predetermined portions of the business entity and wherein the second set of codes is further configured to cause the computer to determine a consumption index for one or more of the predetermined portions of the business entity based on the identified consumption data.

26. The computer program product of claim 25, wherein the seventh set of codes is further configured to cause the computer to apply a translator table to the received consumption data to identify portions of the data associated with predetermined portions of the business entity.

27. The computer program product of claim 21, further comprising a seventh set of codes for causing a computer to receive consumption related information and performing one or more of modifying the consumption index based on the consumption related information or identifying the consumption index as being impacted by the consumption related information.

28. The computer program product of claim 21, wherein the third set of codes is further operable to cause the computer to parse the consumption index into consumption index segments wherein each segment is associated with an organization within the business entity and storing, in computing device memory, the consumption index segments.

* * * * *